US005125232A

United States Patent [19]

Arii et al.

[11] Patent Number: 5,125,232

[45] Date of Patent: Jun. 30, 1992

[54] CONTROL CHANGE SYSTEM FOR A HYDRAULIC WORKING VEHICLE

[75] Inventors: Kazuyoshi Arii; Shiro Watanabe; Kazuhiko Tsuji, all of Sakai, Japan

[73] Assignee: Kubota Corporation, Osaka, Japan

[21] Appl. No.: 691,617

[22] Filed: Apr. 25, 1991

[30] Foreign Application Priority Data

| | | | |
|---|---|---|---|
| May 29, 1990 | [JP] | Japan | 2-140589 |
| May 30, 1990 | [JP] | Japan | 2-142906 |
| May 31, 1990 | [JP] | Japan | 2-57772[U] |
| May 31, 1990 | [JP] | Japan | 2-141800 |
| May 31, 1990 | [JP] | Japan | 2-141801 |
| Aug. 28, 1990 | [JP] | Japan | 2-227339 |

[51] Int. Cl.[5] .......... F16D 31/02; F15B 11/00

[52] U.S. Cl. .......... 60/484; 91/521; 91/530; 137/596.15; 137/635

[58] Field of Search .......... 60/484; 91/521, 522, 91/523, 529, 530; 137/596.15, 635

[56] References Cited

U.S. PATENT DOCUMENTS

| | | | |
|---|---|---|---|
| 3,556,144 | 1/1971 | Bickers | 137/596.15 |
| 4,111,226 | 9/1978 | Cameron | 137/596.15 |
| 4,398,861 | 8/1983 | Shimoie | 414/694 |
| 4,622,998 | 11/1986 | Kussel et al. | 137/596.15 |
| 4,736,647 | 4/1988 | Shimoie et al. | 137/635 |
| 4,986,165 | 1/1991 | Miyaoka | 91/529 |
| 5,044,399 | 9/1991 | Blanz | 137/596.15 |
| 5,074,194 | 12/1991 | Hirata et al. | 60/484 |

FOREIGN PATENT DOCUMENTS

| | | |
|---|---|---|
| 24221 | 7/1989 | Japan . |
| 60702 | 12/1989 | Japan . |

*Primary Examiner*—Edward K. Look
*Assistant Examiner*—Hoang Nguyen
*Attorney, Agent, or Firm*—Edwin E. Greigg; Ronald E. Greigg

[57] ABSTRACT

A control change system for a hydraulic working vehicle having a plurality of hydraulic actuators operable by control levers each shiftable to a plurality of control positions. This system includes a plurality of pilot-operated control valves for controlling pressure oil supply to the hydraulic actuators, respectively, pilot pressure generating valves for generating a pilot pressure in accordance with the control positions of the control levers, and a pilot pressure switching unit for receiving the pilot pressure from the pilot pressure generating valves and outputting the pilot pressure selectively to the control valves. The pilot pressure switching unit includes a plurality of spools slidable to change communicating passages between a pilot pressure input section and a pilot pressure output section of the switching unit.

8 Claims, 15 Drawing Sheets

FIG. 12

| | 1st SPOOL 41 | 2nd SPOOL 42 | 3rd SPOOL 43 | 5th SPOOL 45 |
|---|---|---|---|---|
| I | OUT | OUT | OUT | OUT |
| II | OUT | OUT | IN | OUT |
| III | IN | IN | OUT | OUT |
| IV | IN | IN | OUT | IN |
| V | IN | OUT | OUT | OUT |
| VI | OUT | IN | OUT | IN |

FIG.13

| | LEFT CONTROL LEVER 92 | RIGHT CONTROL LEVER 91 |
|---|---|---|
| I | ARM UP<br>LEFT SWIVEL ←o→ RIGHT SWIVEL<br>ARM DOWN | BOOM DOWN<br>BUCKET LOAD ←o→ BUCKET UNLOAD<br>BOOM UP |
| II | RIGHT SWIVEL<br>ARM UP ←o→ ARM DOWN<br>LEFT SWIVEL | BOOM DOWN<br>BUCKET LOAD ←o→ BUCKET UNLOAD<br>BOOM UP |
| III | BOOM DOWN<br>BUCKET UNLOAD ←o→ BUCKET LOAD<br>BOOM UP | ARM DOWN<br>LEFT SWIVEL ←o→ RIGHT SWIVEL<br>ARM UP |
| IV | BOOM DOWN<br>BUCKET UNLOAD ←o→ BUCKET LOAD<br>BOOM UP | ARM UP<br>LEFT SWIVEL ←o→ RIGHT SWIVEL<br>ARM DOWN |
| V | ARM UP<br>BUCKET UNLOAD ←o→ BUCKET LOAD<br>ARM DOWN | BOOM DOWN<br>LEFT SWIVEL ←o→ RIGHT SWIVEL<br>BOOM UP |
| VI | BOOM DOWN<br>LEFT SWIVEL ←o→ RIGHT SWIVEL<br>BOOM UP | ARM UP<br>BUCKET LOAD ←o→ BUCKET UNLOAD<br>ARM DOWN |

CONTROL CHANGE SYSTEM FOR A HYDRAULIC WORKING VEHICLE

BACKGROUND OF THE INVENTION

Field of the Invention

The present invention relates to a control change system for a hydraulic working vehicle, and more particularly to a system for changing control patterns of hydraulic drive members for driving a boom assembly and a swivel deck of a backhoe.

Such a system for changing control patterns of a boom assembly and a swivel deck of a backhoe is known from U.S. Pat. Nos. 4,398,861 and 4,736,647. The known system comprises hydraulic actuators for driving various parts of the boom assembly and the swivel deck, control valves for supplying and exhausting pressure oil to/from the hydraulic actuators, and a pair of right and left control levers operable fore and aft and right and left. The right and left control levers are mechanically connected to the control valves through push-pull wires and interlocking rods.

With fore and aft and right and left operation of the right and left control levers, the control valves are switched to operate the hydraulic actuators. More particularly, the righthand control lever, for example, is connected to the control valves such that its fore and aft operation moves a boom up and down, and right and left operation thereof causes a bucket to take a loading action. After the righthand lever is placed in a different interlocking relationship with the control valves, its fore and aft operation moves an arm of the boom assembly fore and aft, and right and left operation turns the swivel deck. In this way, control patterns of actuator drive by the control levers are changeable by relocating the push-pull wires and interlocking rods interconnecting the control levers and control valves.

When changing the control patterns as noted above, however, the push-pull wire and interlocking rods connecting one of the control levers to certain of the control valves must be dislodged once and placed in position to connect the other control lever to the same or different control valves. This operation is cumbersome, and it is almost impossible from the structural point of view to provide an increased number of control patterns available for selection.

A different type of control change system is known from Japanese Utility Model Publication No. 1989-24221 and Japanese Patent Publication No. 1989-60702. This system includes pilot pressure generators for supplying a pilot pressure in response to operation of control levers, control valves operable under the pilot pressure to control hydraulic actuators, and a direction changeover valve disposed between the pilot pressure generators and control valves. The direction changeover valve is operable to change control patterns.

However, this system also requires the number of valve positions corresponding to the number of control patterns made available. This results in a direction changeover valve having a large and complicated construction.

SUMMARY OF THE INVENTION

An object of the present invention is to provide a control change system for a hydraulic working vehicle such as a backhoe, which has a simple and compact construction to realize an increased number of control patterns for selection.

A further object of the present invention is to provide a change control mechanism for allowing such a control change system to change from one control pattern to another in a simple way.

The above objects are fulfilled, according to the present invention, by a control change system for a hydraulic working vehicle having operating means shiftable to a plurality of control positions, comprising a plurality of hydraulic actuators; a plurality of pilot-operated control valves for controlling pressure oil supply to the hydraulic actuators, respectively; pilot pressure generating means for generating a pilot pressure in accordance with the control positions of the operating means; and pilot pressure switching means for receiving the pilot pressure from the pilot pressure generating means and outputting the pilot pressure selectively to the control valves, the pilot pressure switching means including an input section for receiving the pilot pressure from the pilot pressure generating means, an output section connected to the control valves for outputting the pilot pressure to the control valves, a plurality of spools slidable to change communicating passages between the input section and the output section, and switching control means for selectively sliding the plurality of spools.

With the control change system as constructed above, when a right control lever constituting the operating means in combination with a left control lever is operated in a fore and aft direction, a pilot pressure corresponding to this operation is generated. This pilot pressure switches a desired control valve (such as for vertically driving the boom).

The spools of the pilot pressure switching means disposed between the pilot pressure generating means and control devices are set to appropriate positions to vary, inside the switching means, destinations of the pilot pressure input thereto. In this way, changes are made in the control patterns of the right and left control levers.

In this case, the destination of the pilot pressure, namely what is controlled by the right and left control levers, is changed by selectively sliding a plurality of groups of the spools in the switching means. Since the slidable spools are provided in the plurality of groups, each spool and an inside oil passage structure are not complicated. A large number of control patterns are readily realized through combinations of different spool positions.

In a preferred embodiment of the present invention, the spools are urged in one sliding direction, and the switching control means includes a disk having a plurality of surface sections divided circumferentially thereof. The disk is rotatable about an axis extending parallel to the spools. Each of the surface sections defines bores for allowing sliding movement in the above-mentioned direction of selected ones of the spools when opposed to the spools with rotation of the disk. This construction realizes a reliable switching control means easily and at low manufacturing cost.

In a further embodiment of the invention, the switching control means includes drive devices for sliding the spools, and an electric control system for controlling the drive devices. This construction allows a desired pattern to be selected from numerous control patterns in a very simple way.

Other objects and features of this invention will be understood from the following description made with reference to the accompanying drawings.

BRIEF DESCRIPTION OF THE DRAWINGS

FIG. 12 is a table showing spool positions corresponding to patterns I through VI, FIG. 13 is a table showing actions taken in patterns I through VI.

DETAILED DESCRIPTION OF THE PREFERRED EMBODIMENTS

Figure 1:
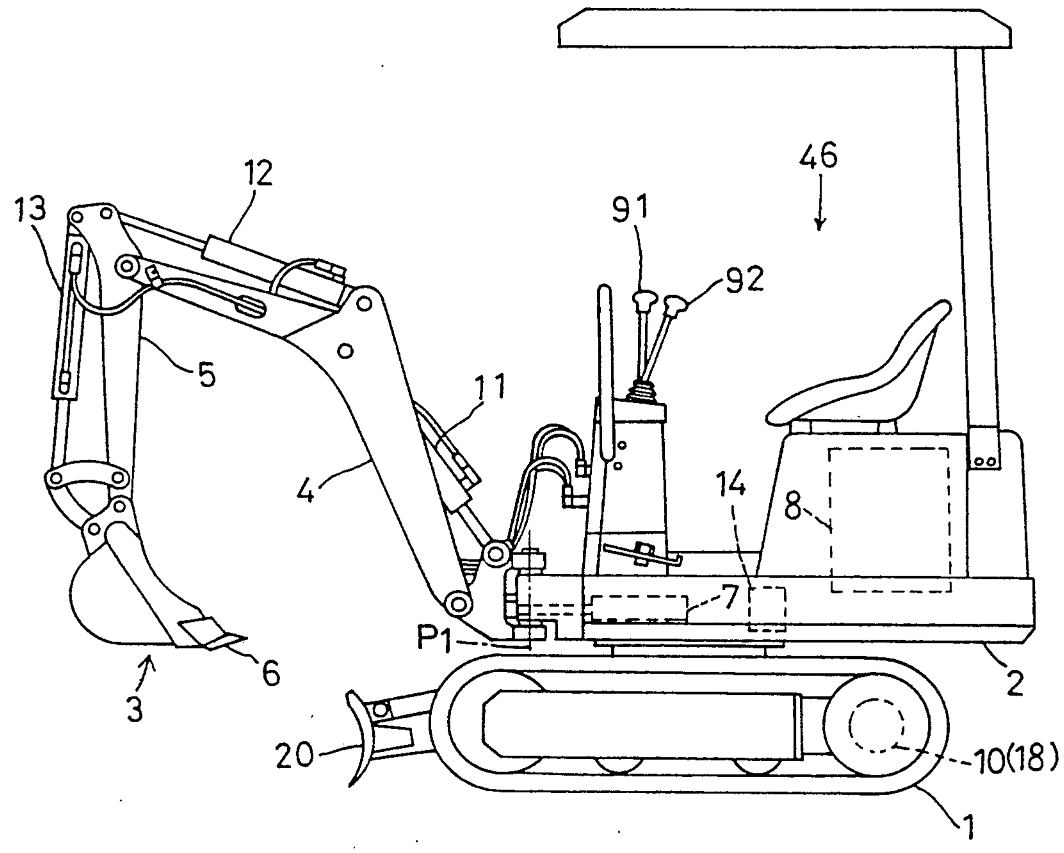
FIG. 1 is a side elevation of a backhoe having a control change system according to the present invention.

FIG. 1 shows a side elevation of a backhoe which is one example of hydraulic working vehicles. The backhoe comprises crawler running devices 1, a swivel deck 2 mounted thereon, and a boom assembly 3 connected to the front of the swivel deck 2. The boom assembly 3 includes a boom vertically swingable by a first hydraulic cylinder 11, an arm 5 swingable fore and aft by a second hydraulic cylinder 12, and a bucket 6 pivotable for scooping action by a third hydraulic cylinder 13. The entire boom assembly 3 is supported to be swingable on a vertical axis P at the front of the swivel deck 2 by a swing cylinder 7. The swivel deck 2 is turned round by a hydraulic motor 14.

A hydraulic circuit for operating the first, second and third hydraulic cylinders 11–13, hydraulic motor 14 and swing cylinder 7 will be described next.

Figure 2:
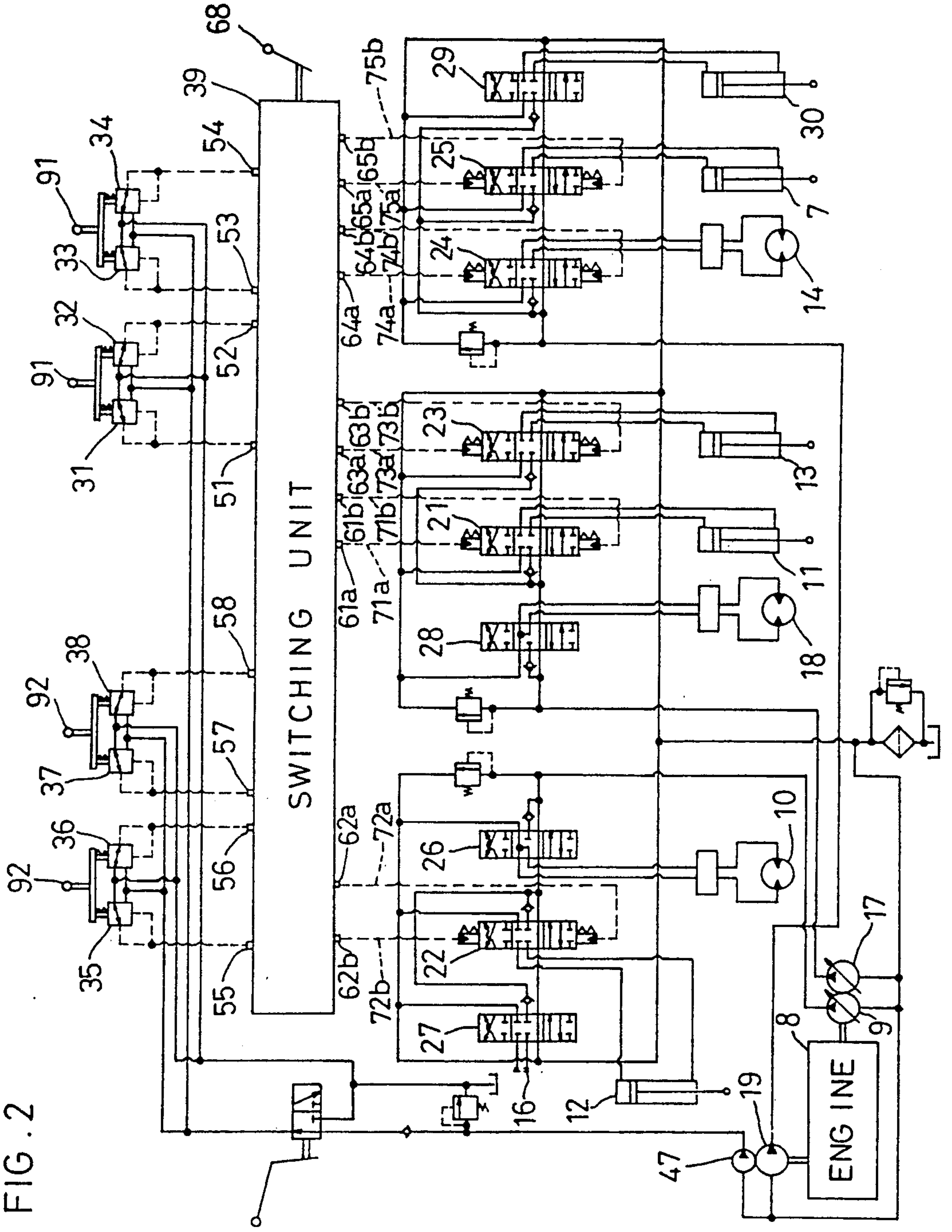
FIG. 2 is a hydraulic circuit diagram showing an interlocking arrangement between right and left control lever and various control valves.

Referring to FIG. 2, the hydraulic circuit includes a first pump 9 of the variable displacement type driven by an engine 8. The first pump 9 supplies pressure oil to a sixth control valve 26 connected to a hydraulic motor 10 for driving the left crawler running device 1, a second control valve 22 connected to the second hydraulic cylinder 12 for driving the arm 5, and a seventh control valve 27 connected to a service port 16. A second pump 17 of the variable displacement type driven by the engine 8 supplies pressure oil to an eighth control valve 28 connected to a hydraulic motor 18 for driving the right crawler running device 1, a first control valve 21 connected to the first hydraulic cylinder 11 for driving the boom 4, and a third control valve 23 connected to the third hydraulic cylinder 13 for driving the bucket 6. A third pump 19 driven by the engine 8 supplies pressure oil to a fourth control valve 24 connected to the hydraulic motor 14 for driving the swivel deck 2, a fifth control valve 25 connected to the swing cylinder 7, and a ninth control valve 29 connected to a lift cylinder 30 for raising and lowering a dozer blade 20 shown in FIG. 1.

The first to fifth control valves 21–25 are neutral-returning, pilot-operated valves. A control structure for operating the first to fifth control valves 21–25 will be described next.

As shown in FIG. 1, the swivel deck 2 carries a driver's section 46 including a right control lever 91 and a left control lever 92 arranged side by side in a forward portion thereof. These control levers 91 and 92 are operable fore and aft and right and left. The right control lever 91 has a first to a fourth pilot valves 31–34 for generating a pilot pressure in response to operation of the control lever 91. Similarly, the left control lever 92 has a fifth to an eighth pilot valves 35–38. A fourth pump 47 driven by the engine 8 supplies pressure oil to the first to eighth pilot valves 31–38. The pilot valves 31–38 supply the pilot pressure through a hydraulic switching unit 39 to the first to fifth control valves 21–25. The switching unit 39 is operable to direct the pilot pressure supply to a selected one of the control valves 21–25.

Details of this hydraulic switching unit 39 will be described next.

Figure 3:
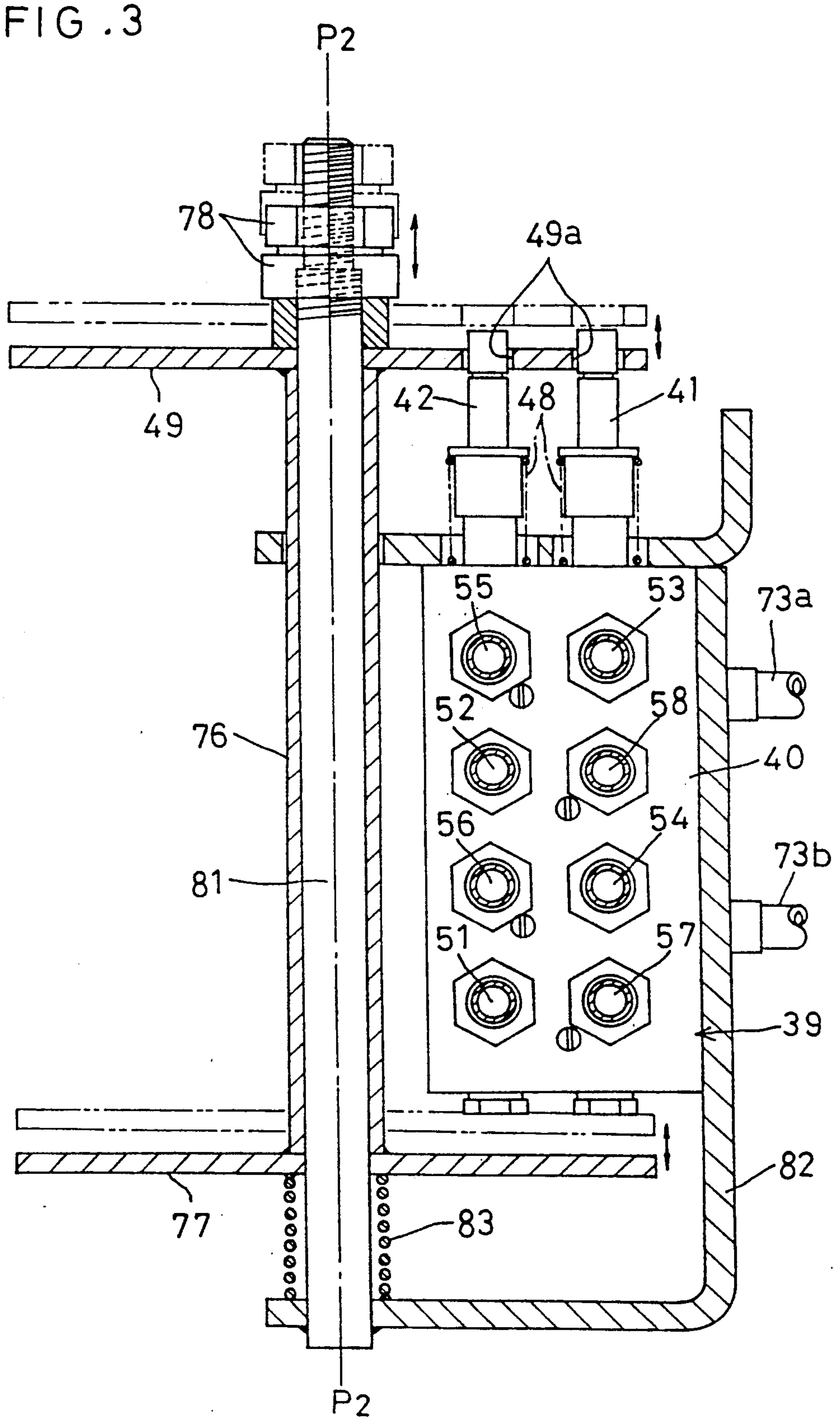
FIG. 3 is a side view of a hydraulic switching unit.
Figure 4:
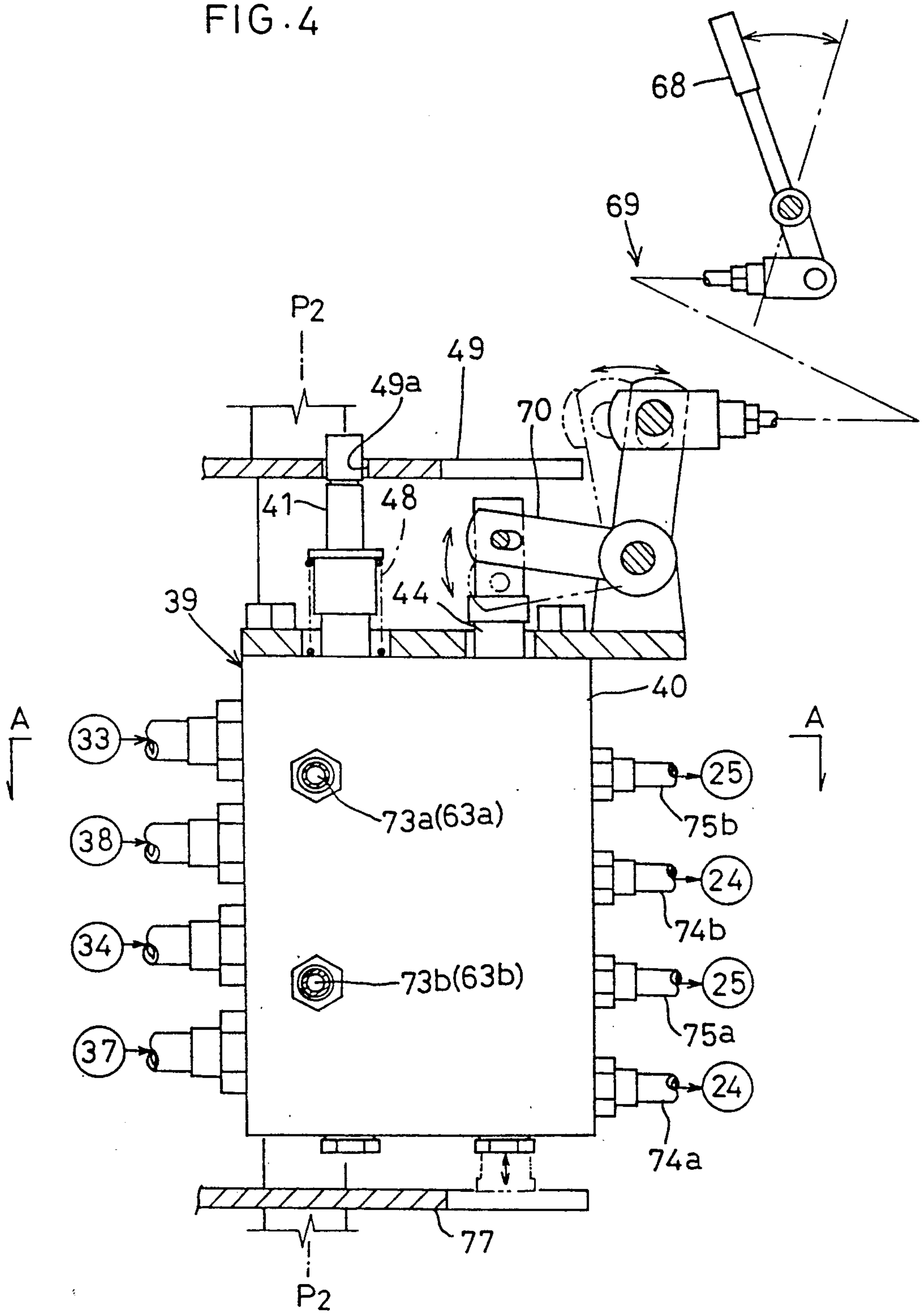
FIG. 4 is a front view of the switching unit.
Figure 5:
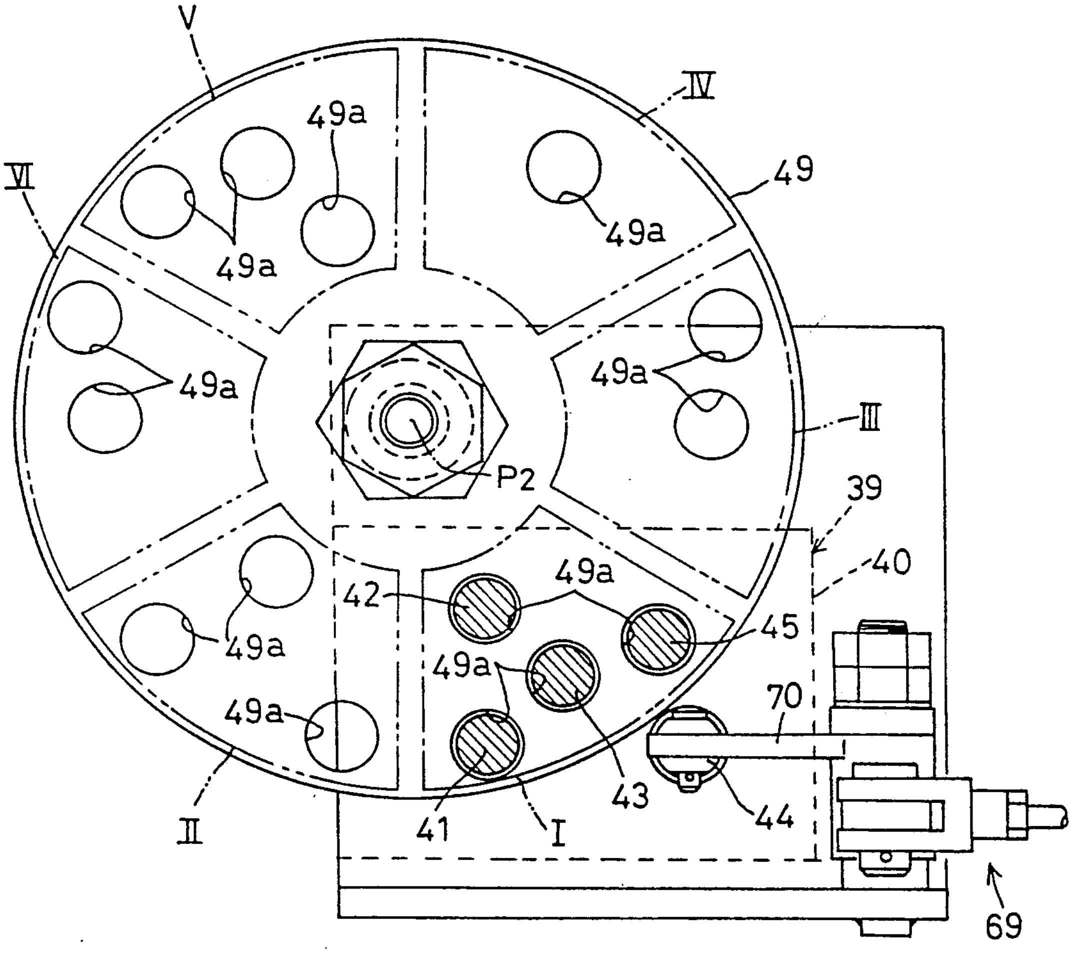
FIG. 5 is a plan view of the switching unit and a control member.
Figure 6:
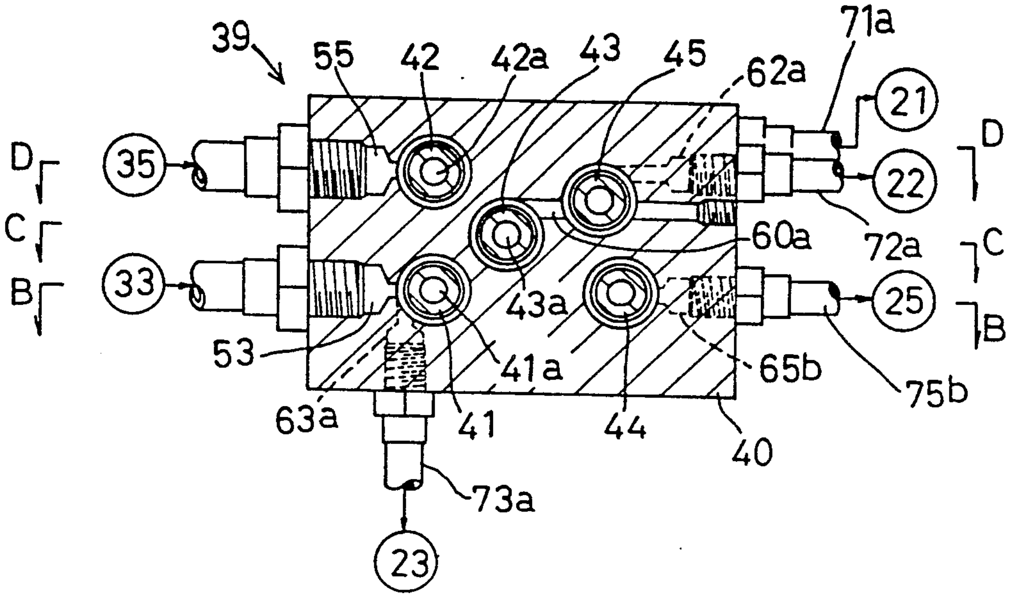
FIG. 6 is a section taken on line A—A of FIG. 4.
Figure 9:
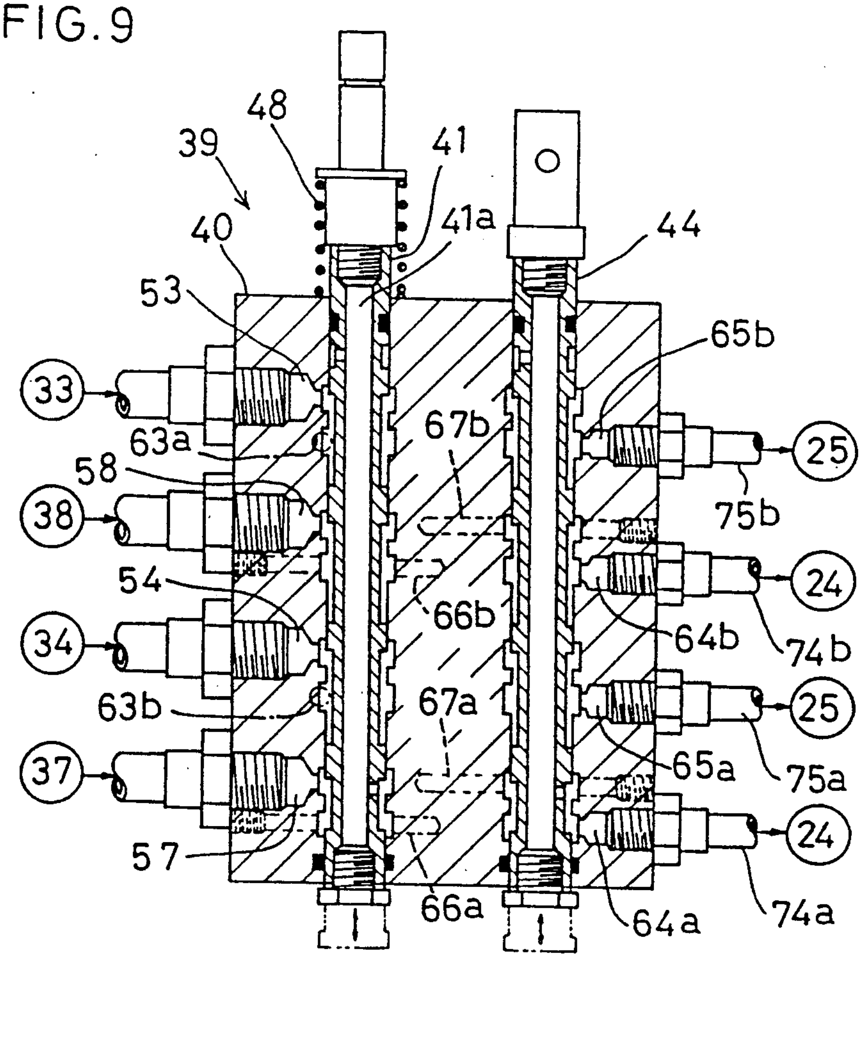
FIG. 9 is a section taken on line B—B of FIG. 6.
Figure 8:
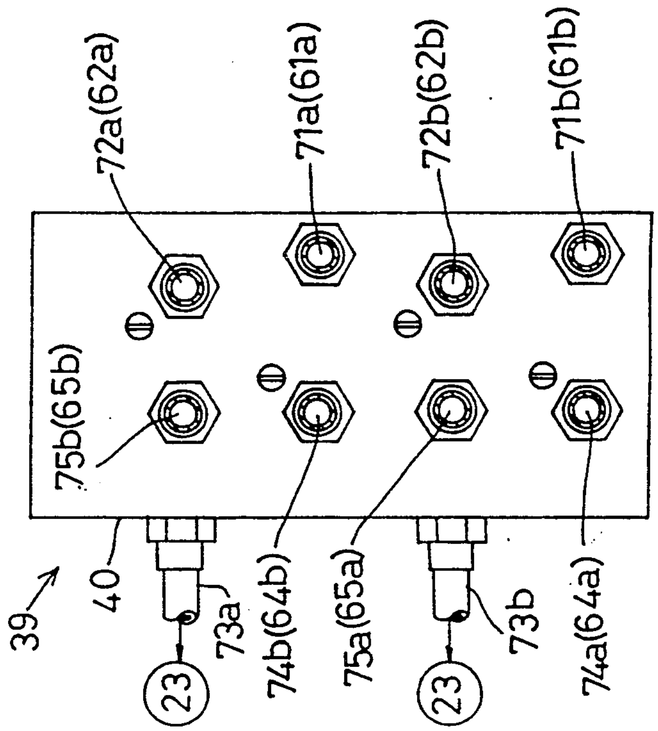
FIG. 8 is a side view of the switching unit showing output ports thereof.
Figure 7:
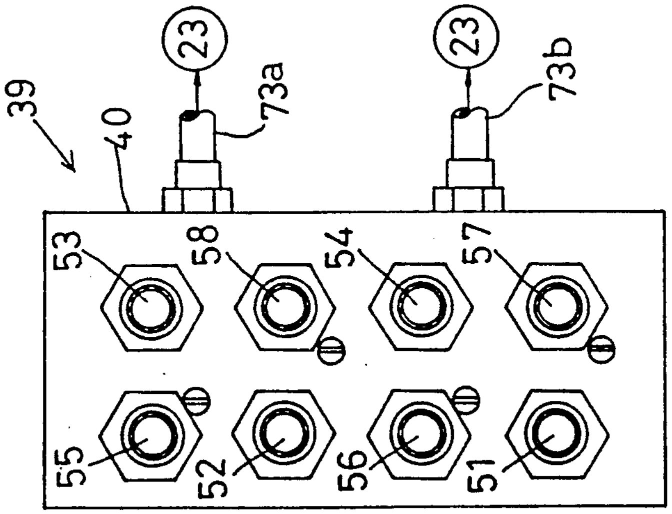
FIG. 7 is a side view of the switching unit showing input ports thereof.
Figure 11:
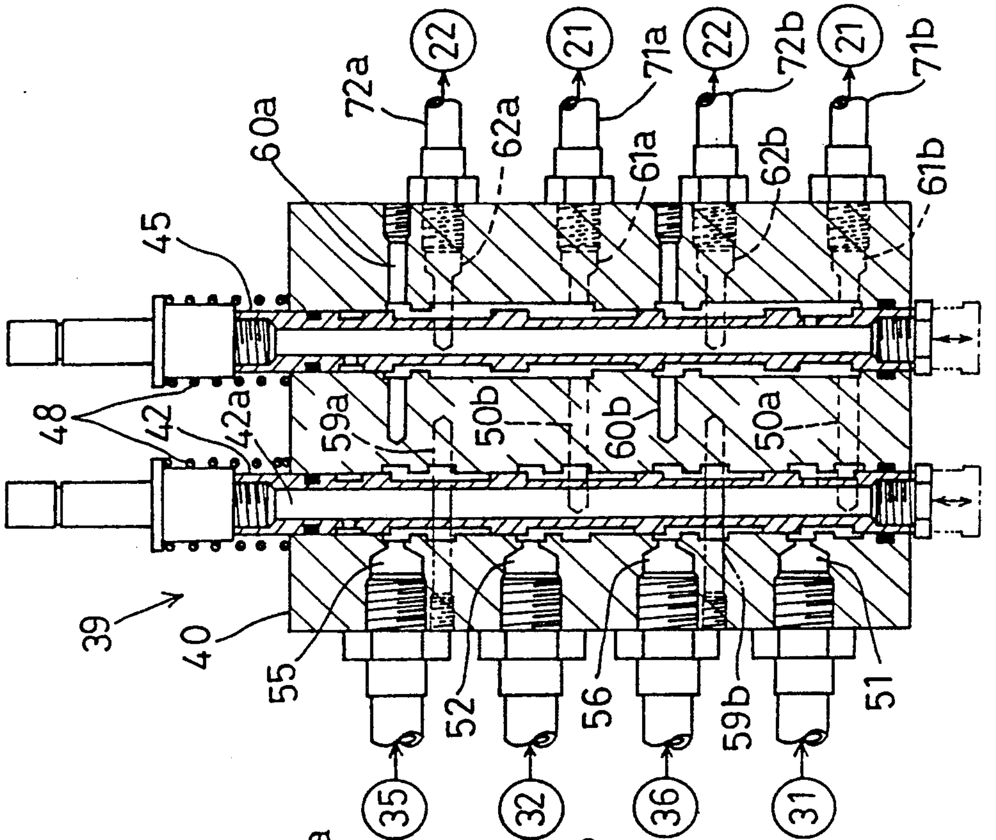
FIG. 11 is a section taken on line D—D of FIG. 6.
Figure 10:
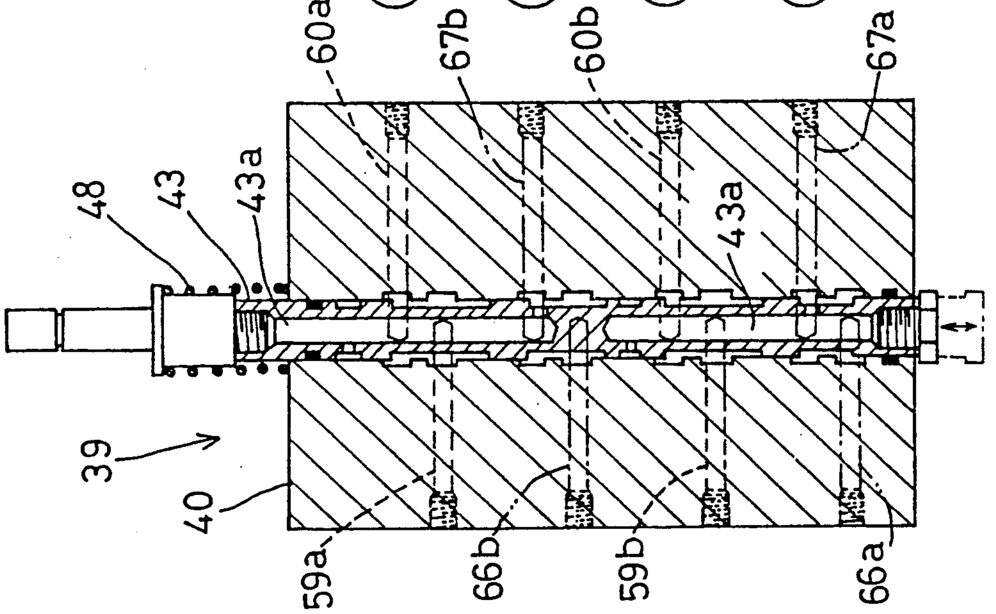
FIG. 10 is a section taken on line C—C of FIG. 6.

As shown in FIGS. 3, 4 and 5, the hydraulic switching unit 39 comprises a main block 40 including a first to a fifth slidable spools 41–45 arranged parallel to one another and distributed to different planes. The first, second, third and fifth spools 41, 42, 43 and 45 are urged by springs 48, so that upper ends thereof project from the main block 40 (upwardly in FIG. 3). A control disk 49 is disposed upwardly of the hydraulic switching unit 39. The control disk 49 is rotatable about a rod 81 having a vertical axis P2, and vertically slidable along the rod 81. A tubular member 76 is fixed to an undersurface of the control disk 49 and loosely fitted on the rod 81. A return control member 77, which will be described later, is fixed to a lower end of the tubular member 76 and loosely fitted on the rod 81. A bracket 82 is attached to a lower end of the rod 81. As seen from FIG. 3, the main block 40 of the switching unit 39 is attached to this bracket 82. A coil spring 83 is loosely fitted on the rod 81 between the return control member 77 and bracket 81.

The control disk 49 defines bores 49*a* for receiving the upper ends of the first, second, third and fifth spools 41, 42, 43 and 45. The control disk 49 includes six patterns I, II, III, IV, V and VI different in number and location of the bores 49*a*.

In the position shown in FIG. 5, the control disk 49 is lowered and fixed with the pattern I opposed to the hydraulic switching unit 39. In this position, the upper ends of the first, second, third and fifth spools 41, 42, 43 and 45 project from the main block 40 and extend into four bores 49*a*. The control disk 49 is fixed in the lowered position by a pair of nuts 78.

As shown in FIGS. 3, 4, 6 7 and 8, the first to eighth pilot valves 31-38 supply the pilot pressure to a first to an eighth input ports 51-58 arranged on a lateral face of the main block 40. The main block 40 has a first to a fifth output ports 61*a*, 61*b* through 65*a*, 65*b* arranged on different lateral faces thereof. As shown in FIG. 2, a first to a fifth pilot oil lines 71*a*, 71*b* through 75*a*, 75*b* extend between the output ports 61*a*-65*b* and the control valves 21-25.

In the position shown in FIGS. 3 through 11, when the right control lever 91 is operated forward or backward (see "I" in FIG. 13), the pilot pressure is supplied from the first or second pilot valve 31 or 32 to the first control valve 21 through the first or second input port 51 or 52, the second spool 42, an inside oil passage 50*a* or 50*b*, the first output port 61*b* or 61*a*, and the first pilot oil line 71*b* or 71*a*. As a result, the first control valve 21 for controlling the boom 4 is operated to a lowering position or a raising position.

When the right control lever 91 is operated right or left, the pilot pressure is supplied from the third or fourth pilot valve 33 or 34 to the third control valve 23 through the third or fourth input port 53 or 54, the first spool 41, the third output port 63*a* or 63*b*, and the third pilot oil line 73*a* or 73*b*. As a result, the third control valve 23 for controlling the bucket 6 is operated to an unloading position or a loading position.

When the left control lever 92 is operated forward or backward, the pilot pressure is supplied from the fifth or sixth pilot valve 35 or 36 to the second control valve 22 through the fifth or sixth input port 55 or 56, the second spool 42, an inside oil passage 59*a* or 59*b*, the third spool 43, an inside oil passage 60*a* or 60*b*, the fifth spool 45, the second output port 62*a* or 62*b*, and the second pilot oil line 72*a* or 72*b*. As a result, the first control valve 22 for controlling the arm 5 is operated to a raising position or a loading position.

When the left control lever 92 is operated right or left, the pilot pressure is supplied from the seventh or eighth pilot valve 37 or 38 to the fourth control valve 24 through the seventh or eighth input port 57 or 58, the first spool 41, an inside oil passage 67*a* or 67*b*, the fourth spool 44, the fourth output port 64*a* or 64*b*, and the fourth pilot oil line 74*a* or 74*b*. As a result, the fourth control valve 24 for controlling the swivel deck 2 is operated to a right swivel position or a left swivel position.

Next, when the control disk 49 is lowered with the pattern II opposed to the hydraulic switching unit 39, the control disk 49 depresses the third spool 43 as shown in FIGS. 5 and 12. This results in no change to the effects produced by the operation of the right control lever 91, as shown in "pattern II" in FIG. 13. However, the third spool 43 and an inside oil line 43*a* transmit the backward and forward operation of the left control lever 92 to the fourth control valve 24 for controlling the swivel deck 2, and the right and left operation thereof to the second control valve 22 for controlling the arm 5.

When the control disk 49 is lowered with the pattern III opposed to the hydraulic switching unit 39, the control disk 49 depresses the first and second spools 41 and 42 as shown in FIGS. 5 and 12. This results in the changes shown in "pattern III" in FIG. 13. That is, the second spool 42 transmits the backward and forward operation of the right control lever 91 to the second control valve 22 for controlling the arm 5, and the first spool 41 and inside oil passage 41*a* transmit the right and left operation thereof to the fourth control valve 24 for controlling the swivel deck 2. Further, the second spool 42 and an inside oil line 42*a* transmit the backward and forward operation of the left control lever 92 to the first control valve 21 for controlling the boom 4, and the first spool 41 transmits the right and left operation thereof to the third control valve 23 for controlling the bucket 6.

When the pattern IV of the control disk 49 is used, the first, second and fifth spools 41, 42 and 45 are depressed as shown in FIGS. 5 and 12. As a result, the backward and forward operation of the right control lever 91 is interlocked with the second control valve 22 for controlling the arm 5 as reversed from the pattern III, as shown in "pattern IV" in FIG. 13. The other functions are the same as when the pattern III is used.

When the pattern V of the control disk 49 is used, the first spool 41 is depressed as shown in FIGS. 5 and 12. As a result, the first spool 41 and inside oil passage 41*a* transmit and the right and left operation of the right control lever 91 to the fourth control valve 24 for controlling the swivel deck 2, and the right and left operation of the left control lever 92 to the third control valve 23 for controlling the bucket 6 as reversed from the pattern I. The other functions are the same as when the pattern I is used.

When the pattern VI of the control disk 49 is used, the second and fifth spools 42 and 45 are depressed as shown in FIGS. 5 and 12. As a result, the backward and forward operation of the right control lever 91 is interlocked with the second control valve 22 for controlling the arm 5, and the backward and forward operation of the left control lever 92 is interlocked with the first control valve 22 for controlling the boom 4. The other functions are the same as when the pattern I is used.

As shown in FIGS. 2, 4 and 5, the fourth spool 44 is interlocked with a switch lever 68 through an interlocking link 69 and a control arm 70. When the switch lever 68 is operated to depress the fourth spool 44 into the main block 40, the pilot pressure for the fourth output port 64*a* or 64*b* is supplied through the inside oil passage 67*a* or 67*b* to the fifth output port 65*a* or 65*b*. That is, the right and left swivels in the "pattern I" through "pattern VI" in FIG. 13 are replaced by right and left swings of the boom assembly 3 caused by extension and contraction of the swing cylinder 7.

The switching among the patterns I through VI are effected by vertically moving the control disk 49 along the vertical axis P2 and turning the control disk 49 about this axis P2. As shown in FIGS. 3 and 4, the return control member 77 having the same diameter as the control disk 49 is fixed to the lower end of the tubular member 76 supporting the control disk 49. However, the return control member 77 defines no bores as in the control disk 49. When, for example, the state of using the pattern II of the control disk 49 (with the third spool 43 depressed) is changed to the use of the pattern III, the control disk 49 is moved upward in FIG. 3 which allows the third spool 43 to be raised to a predetermined position by the spring 48. If the third spool 43 is clogged by foreign matters or otherwise held against upward movement, the return control member 77 contacts the lower end of the third spool 43 in the depressed position, thereby forcing the third spool 43 upward.

Figure 14:
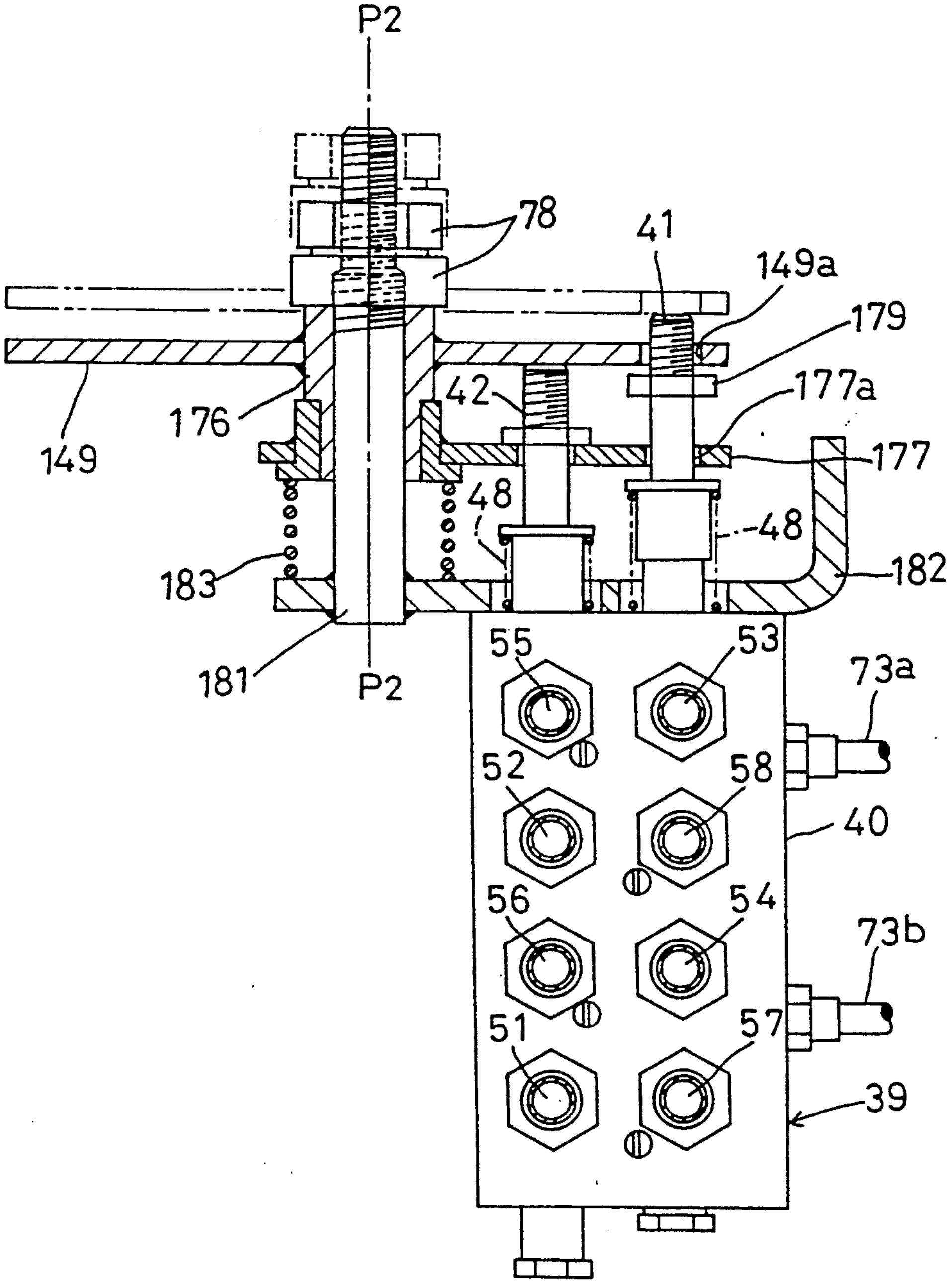
FIG. 14 is a side view corresponding to FIG. 3 and showing a hydraulic switching unit in a different embodiment.

FIG. 14 shows a different spool control mechanism. The illustrated construction includes a short tubular member 176 supporting a control disk 149 and a return control member 177 lying between the control disk 149 and the switching unit 39. The return control member 177 defines bores 177*a* for receiving the first, second, third and fifth spools 41, 42, 43 and 45. The first, second, third and fifth spools 41, 42, 43 and 45 carry stopper rings 179. A bracket 182 is fixed to a lower end of a rod 181, and the main block 40 of the switching unit 39 is attached at an upper end thereof to the undersurface of the bracket 182. A coil spring is likewise mounted between the return control member 177 and bracket 182. According to this construction, when the control disk 149 is lowered, the first, second, third and fifth spools 41, 42, 43 and 45 are not depressed by the return control member 177. When the control disk 149 is raised, the first, second, third and fifth spools 41, 42, 43 and 45 are raised to a predetermined position by engagement between the return control member 177 and stopper rings 179.

Figure 15:
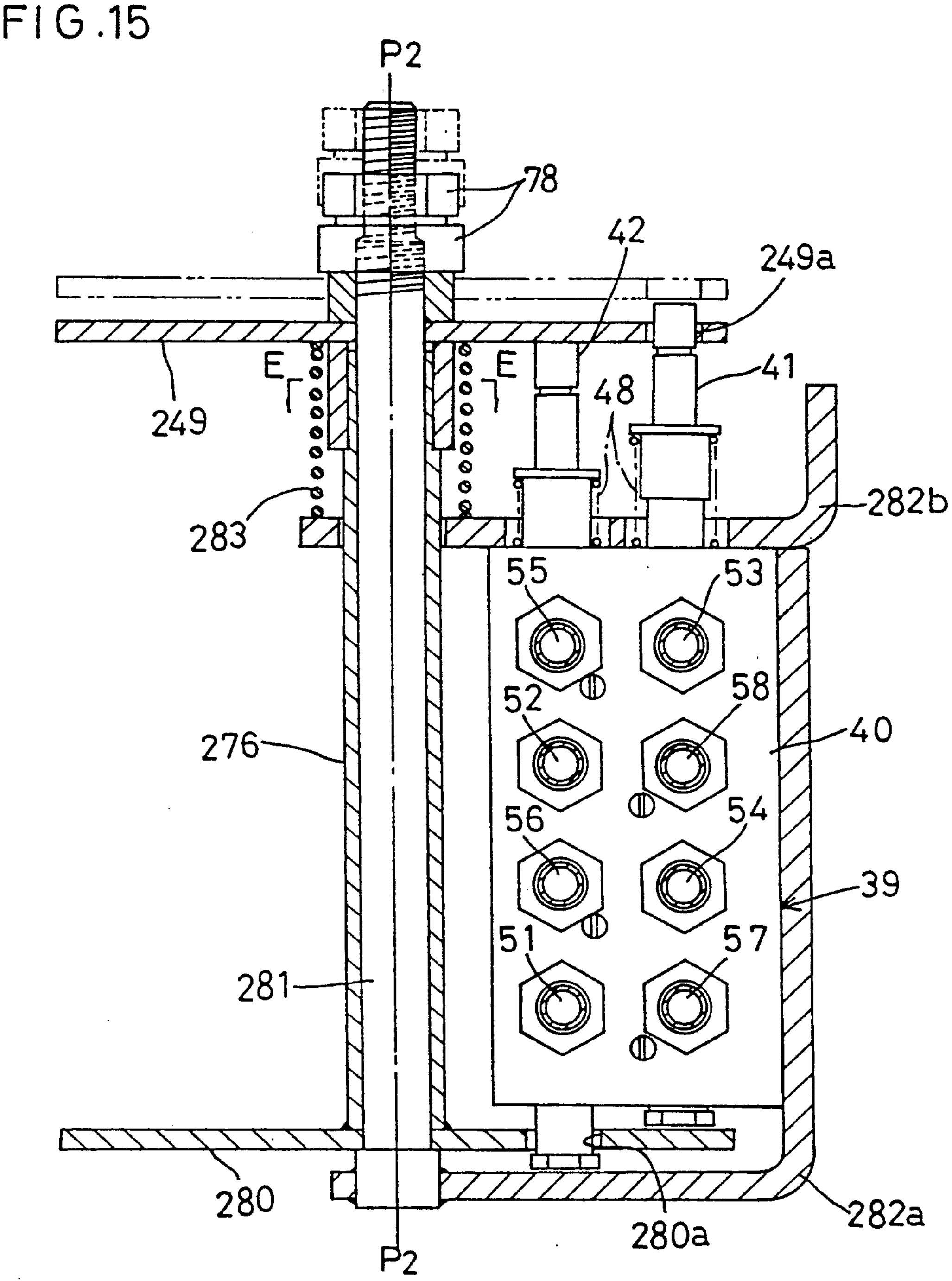
FIG. 15 is a side view corresponding to FIG. 3 and showing a hydraulic switching unit in a further embodiment.
Figure 16:
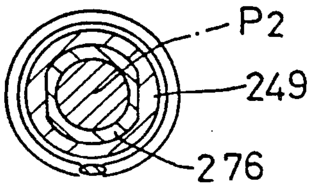
FIG. 16 is a section taken on line E—E of FIG. 15.
Figure 17:
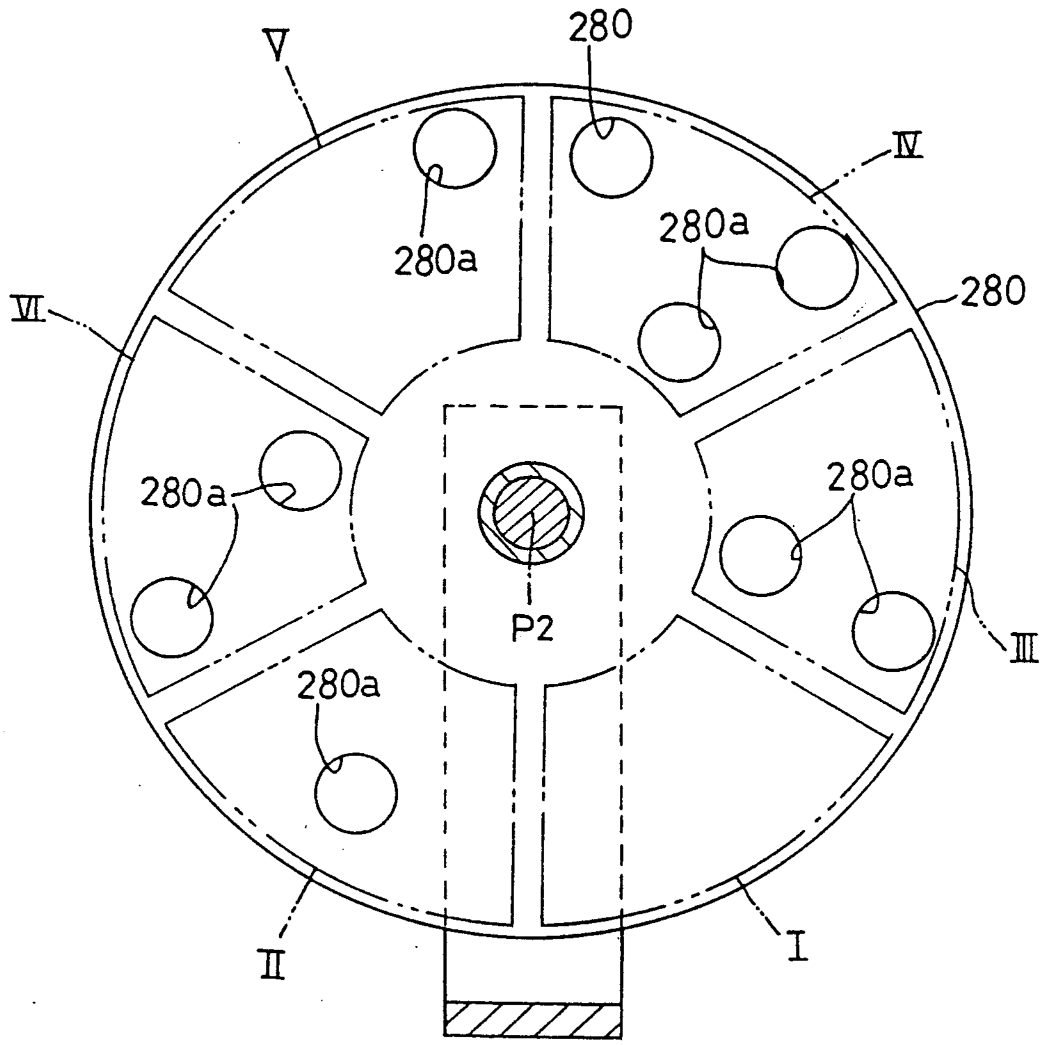
FIG. 17 is a plan view of a detecting device shown in FIG. 15.

FIGS. 15 through 17 show a further embodiment of the invention. This embodiment includes a control disk 249 and a tubular member 276 have a cutout construction to be rotatable in unison, with the control disk 249 slidable relative to the tubular member 249. The nuts 78 are used to lock the control disk 249 to a lowered position.

Here again, a bracket 282*a* is fixed to the lower end of a rod 281. In addition, an auxiliary bracket 282*b* is loosely fitted on the tubular member 276 and attached to an upper face of the main block 40 of the switching unit 39. A coil spring 283 is mounted between the control disk 249 and auxiliary bracket 182*b*. A disk-shaped detecting device 280 is fixed to the lower end of the tubular member 276. As shown in FIG. 17, the detecting device 280 includes bores 280*a* not in opposed relations with bores 249*a* of the control disk 249 shown in FIG. 15. The bores 280*a* are arranged in positions opposed to portions of the control disk 249 where no bores are defined, for receiving the lower ends of the first, second, third and fifth spools 41, 42, 43 and 45.

When, in the state shown in FIG. 15, the control disk 249 is lowered and fixed, the second spool 42 is depressed by the control disk 249, with the lower end thereof extending into a bore 280*a* in the detecting device 280. At this time, the first spool 41 has the upper end extending into a bore 249*a* in the control disk 249, and the lower end thereof is contacted by the detecting device 280 against downward movement. When the control disk 249 is raised for a control change, the second spool 42 is also raised by the spring 48.

If the second spool 42 is clogged by foreign matters against upward movement, the lower end of the second spool 42 remains in the bore 280*a* in the detecting device 280. When an attempt is made in this state to rotate the control disk 249 and detecting device 280 about the vertical axis P2, the lower end of the second spool 42 engaging the bore 280*a* in the detecting device 42 prevents rotation of the control disk 249 and detecting device 280. At this time, the operator becomes aware of the abnormality.

The return control member 77 vertically movable with the control disk 49 in FIG. 3 may have the same function as the detecting device in FIG. 15, by including bores similar to those of the detecting device (i.e. bores defined in positions opposed to portions of the control disk 49 where the bores 49*a* are not defined). When, for example, the control disk 49 and return control member 77 are raised with the second spool 42 remaining depressed, the lower end of the second spool 42 enters one of the bores in the return control member 77. Consequently, the control disk 49 and return control member 77 cannot be rotated in this state. It will be appreciated that the detecting device 280 or the return control member 77 may include recesses instead of the bores.

Figure 18:
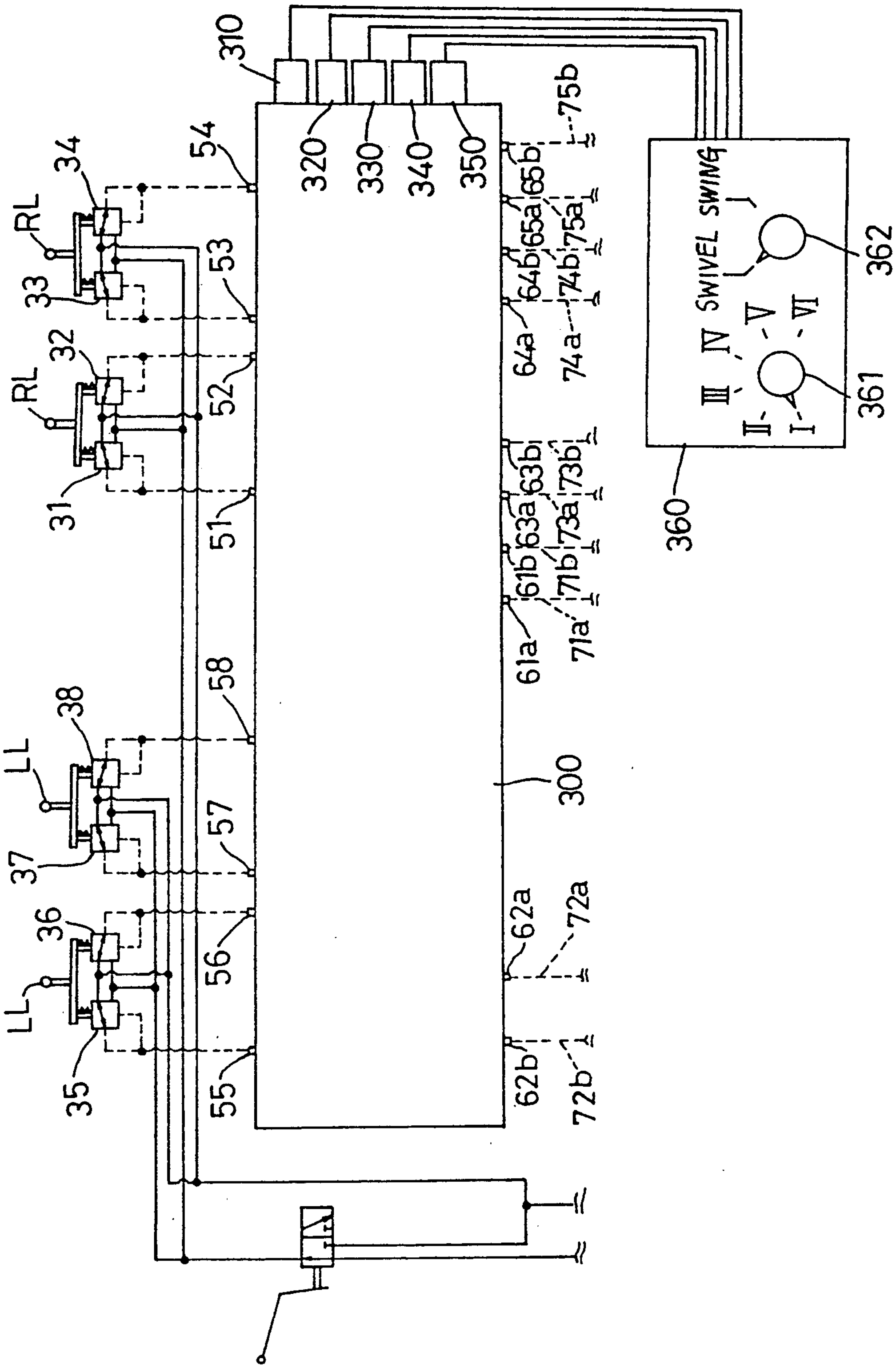
FIG. 18 is a circuit diagram corresponding to FIG. 2 and showing a hydraulic switching unit in a still further embodiment.
Figure 19:
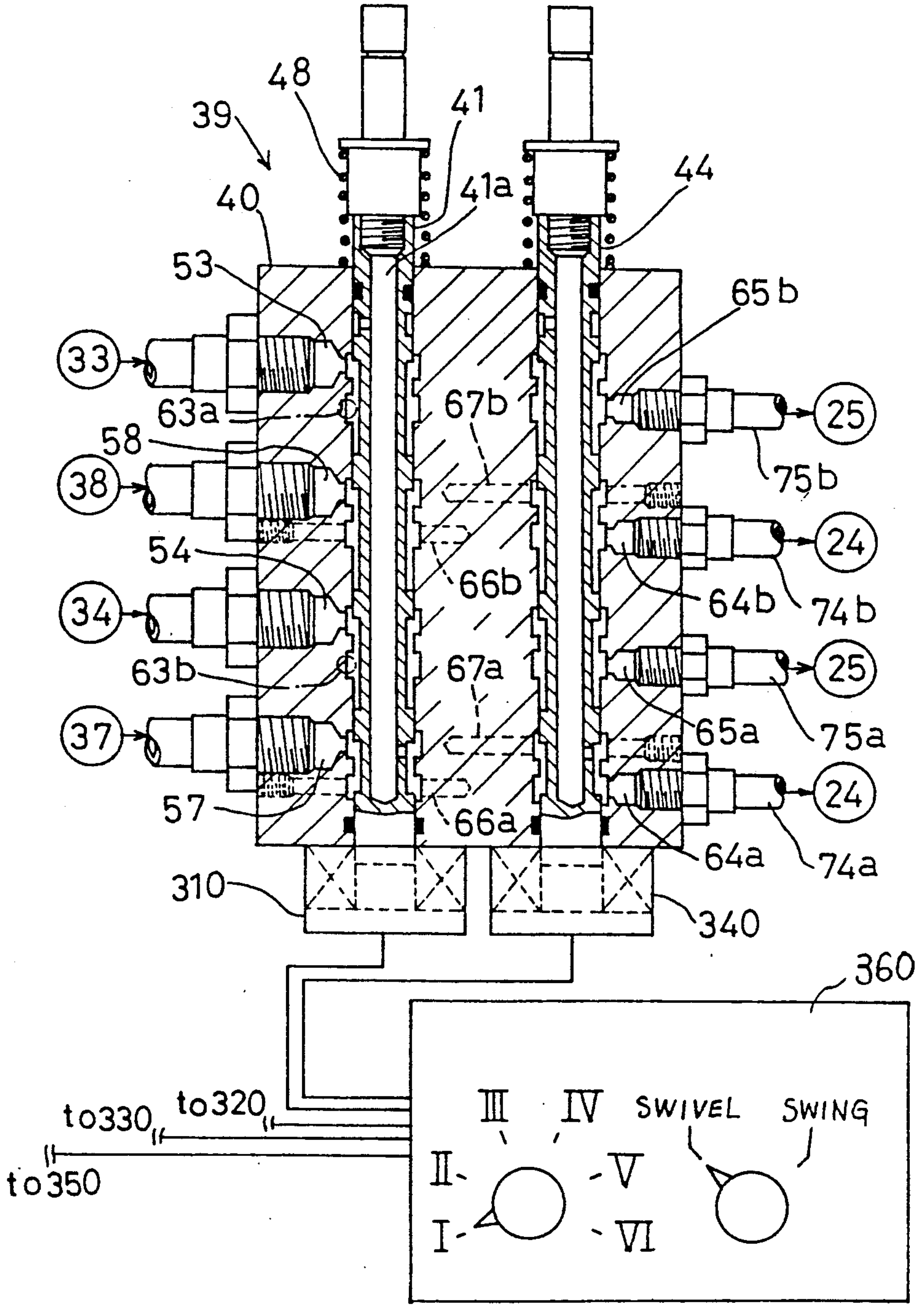
FIG. 19 is a sectional view corresponding to FIG. 6 and showing the switching unit of FIG. 18.

FIGS. 18 and 19 show a hydraulic switching unit 300 having spools driven electromagnetically, i.e. by solenoids. As in the preceding embodiments, the hydraulic switching unit 300 comprises a main block 40 including a first to a fifth slidable spools 41–45 arranged parallel to one another and distributed to different planes. The first to fifth spools 41–45 are urged by springs 48, so that upper ends thereof project from the main block 40. The characterizing feature of this embodiment lies in that a first to a fifth solenoids 310–350 are attached to the lower ends of the first to fifth spools 41–45 for sliding the latter. Because of the arrangement, only the first and fourth solenoids are visible in FIG. 19. The solenoids are connected to a control device 360 which outputs drive signals to the solenoids. By operating a first switch 361 of the control device 360, the first, second, third and fifth spools 41, 42, 43 and 45 are slidable in the patterns I–VI in FIG. 12. The "OUT" in FIG. 12 corresponds to the state shown in FIG. 19, and the "IN" to a state in which the first, second, third and fifth spools 41, 42, 43 and 45 are driven by the first, second, third and fifth solenoids 310, 320, 330 and 350 to slide downwardly in FIG. 19.

FIG. 19 shows a state in which the first switch 361 of the control device 360 is operated to provide the pattern I.

The fourth spool 44 is operable by a second switch 362 of the control device 360. When the second switch 362 is set to "SWING", the fourth spool 44 is depressed into the main block 40. Then, the pilot pressure for the fourth output port 64*a* or 64*b* is supplied through the inside oil passage 67*a* or 67*b* to the fifth output port 65*a* or 65*b*. That is, the right and left swivels in the "pattern I" through "pattern VI" in FIG. 12 are replaced by right and left swings of the boom assembly 3 caused by extension and contraction of the swing cylinder 7.

What is claimed is:

1. A control change system for a hydraulic working vehicle having operating means shiftable to a plurality of control positions, comprising;

- a plurality of hydraulic actuators,
- a plurality of pilot-operated control valves for controlling pressure oil supply to said hydraulic actuators, respectively,
- pilot pressure generating means for generating a pilot pressure in accordance with said control positions of said operating means, and
- pilot pressure switching means for receiving said pilot pressure from said pilot pressure generating means and outputting said pilot pressure selectively to said control valves, said pilot pressure switching means including;
  - an input section for receiving said pilot pressure from said pilot pressure generating means,
  - an output section connected to said control valves for outputting said pilot pressure to said control valves,
  - a plurality of spools slidable to change communicating passages between said input section and said output section, and
  - switching control means for selectively sliding said plurality of spools.

2. A control change system as claimed in claim 1, wherein said switching control means includes a plurality of surface sections, each of said surface sections defining bores for allowing sliding movement of selected ones of said spools, arrangement patterns of said bores in the respective surface sections determining operation of said actuators based on operation of said operating means.

3. A control change system as claimed in claim 2, wherein said switching control means further includes a mechanism for causing those of said spools opposed to said bores to slide and extend into said bores.

4. A control change system as claimed in claim 3, wherein said switching control means further includes a mechanism for forcibly sliding all of said spools.

5. A control change system as claimed in claim 1, wherein said spools are urged in one sliding direction, and said switching control means includes a disk having a plurality of surface sections divided circumferentially thereof, said disk being rotatable about an axis extending parallel to said spools, each of said surface sections defining bores for allowing sliding movement in said direction of selected ones of said spools when opposed to said spools with rotation of said disk.

6. A control change system as claimed in claim 5, wherein said switching control means further includes a return mechanism for forcibly sliding said spools in the other sliding direction.

7. A control change system as claimed in claim 5, wherein said switching control means further includes electrically operable actuator means for selectively sliding said spools.

8. A hydraulic circuit construction for a backhoe having a right control lever (91) and a left control lever (92) each operable fore and aft and right and left, comprising;

(A) a first hydraulic actuator (11) for vertically swinging a boom (4) of a boom assembly (3), a second hydraulic actuator (12) for swinging fore and aft an arm (5) of said boom assembly (3), a third hydraulic actuator (13) for driving a bucket (6) of said boom assembly (3) in a scooping direction, and a fourth hydraulic actuator (14) for turning a swivel deck (2), (B) a first to a fourth pilot-operated control valves (21, 22, 23, 24) for supplying and exhausting pressure oil to/from said first to fourth hydraulic actuators (11, 12, 13, 14), (C) pilot valves (31, 32, 33, 34, 35, 36, 37, 38) for generating a pilot pressure corresponding to fore and aft and right and left operations of said right and left control levers (91, 92), respectively, and (D) a hydraulic switching unit (39) having a plurality of slidable spools (41, 42, 43, 44, 45) for transmitting the pilot pressure from said pilot valves (31, 32, 33, 34, 35, 36, 37, 38) to said first to fourth control valves (21, 22, 23, 24), said first to fourth control valves (21, 22, 23, 24) being switchable by said pilot pressure, (E) said spools (41, 42, 43, 44, 45) of said hydraulic switching unit (39) being selectively slidable to transmit the pilot pressure from said pilot valves (31, 32, 33, 34, 35, 36, 37, 38) to selected ones of said first to fourth control valves (21, 22, 23, 24).

* * * * *